March 16, 1954 — A. DE MARCHI — 2,672,062
TORQUE TRANSMISSION
Filed Oct. 10, 1952 — 4 Sheets-Sheet 1

Inventor
Alessandro De Marchi
By Robert E. Burns
Attorney

March 16, 1954     A. DE MARCHI     2,672,062
TORQUE TRANSMISSION

Filed Oct. 10, 1952     4 Sheets-Sheet 3

Inventor
Alessandro De Marchi
By Robert E. Burns
Attorney

March 16, 1954 — A. DE MARCHI — 2,672,062
TORQUE TRANSMISSION
Filed Oct. 10, 1952 — 4 Sheets-Sheet 4

Inventor
Alessandro De Marchi
By Robert E Burns
Attorney

Patented Mar. 16, 1954

2,672,062

UNITED STATES PATENT OFFICE 2,672,062

TORQUE TRANSMISSION

Alessandro De Marchi, Biella, Italy

Application October 10, 1952, Serial No. 314,135

3 Claims. (Cl. 74—679)

This invention relates to a torque transmission, more particularly suitable for machine tools, textile machines and motor vehicles.

My improved transmission comprises a rotary input shaft, oscillatory means actuated by said shaft, an output shaft, and one-way clutching means actuated by said oscillatory means and transmitting the movement to said output shaft.

In operation, rotation of the input shaft oscillates said oscillatory means. In this case, the one-way clutching means acts simply like an electric rectifier rectifying all homonymous halfwaves of the oscillatory movement of said oscillatory means and transmitting the resulting unidirectional impulses to the output shaft.

In an embodiment my improved transmission comprises a rotary input shaft, an eccentric member positioned on said shaft, oscillatory means actuated by said eccentric member, an output shaft, a wheel on said shaft, and one-way clutching means actuated by said oscillatory means and transmitting movement to said wheel.

By varying the eccentricity of said eccentric member, the width of oscillation of said oscillatory means is varied, the frequence (which depends upon the rotational speed of the input shaft) being equal or not, this resulting in variation of the characteristics of the movement transmitted to the output shaft by said one-way clutching means. The corresponding embodiment therefore comprises a rotary input shaft, an eccentric member positioned on said shaft, means for varying the eccentricity of said member, a series, concentric with said shaft, of oscillatory means actuated in turn by said eccentric member, an output shaft, a wheel on said shaft, and one-way clutching means acting between said oscillatory means and said wheel.

The movement of the output shaft becomes smoother and more uniform when said oscillatory means consists of a series, concentric with the input or output shaft, of equal oscillatory means actuated in turn, one after another, by the eccentric member of the input shaft.

The oscillatory means and the one-way clutching means can be supported by the fixed housing of the transmission, but, according to a feature of this invention, they may be supported by a rotatable support, of which the rotation is added, under given conditions, to the movement transmitted by the one-way clutch means, so that the output shaft receives the sum of the two movements, free-wheeling detent being provided for locking said rotatable support in conditions other than those described above.

The invention shall be better understood from the accompanying drawings which show by way of example a preferred embodiment in connection with an automatic change speed gear for motor vehicles, machine tools and other purposes. On the drawing.

Figure 1:
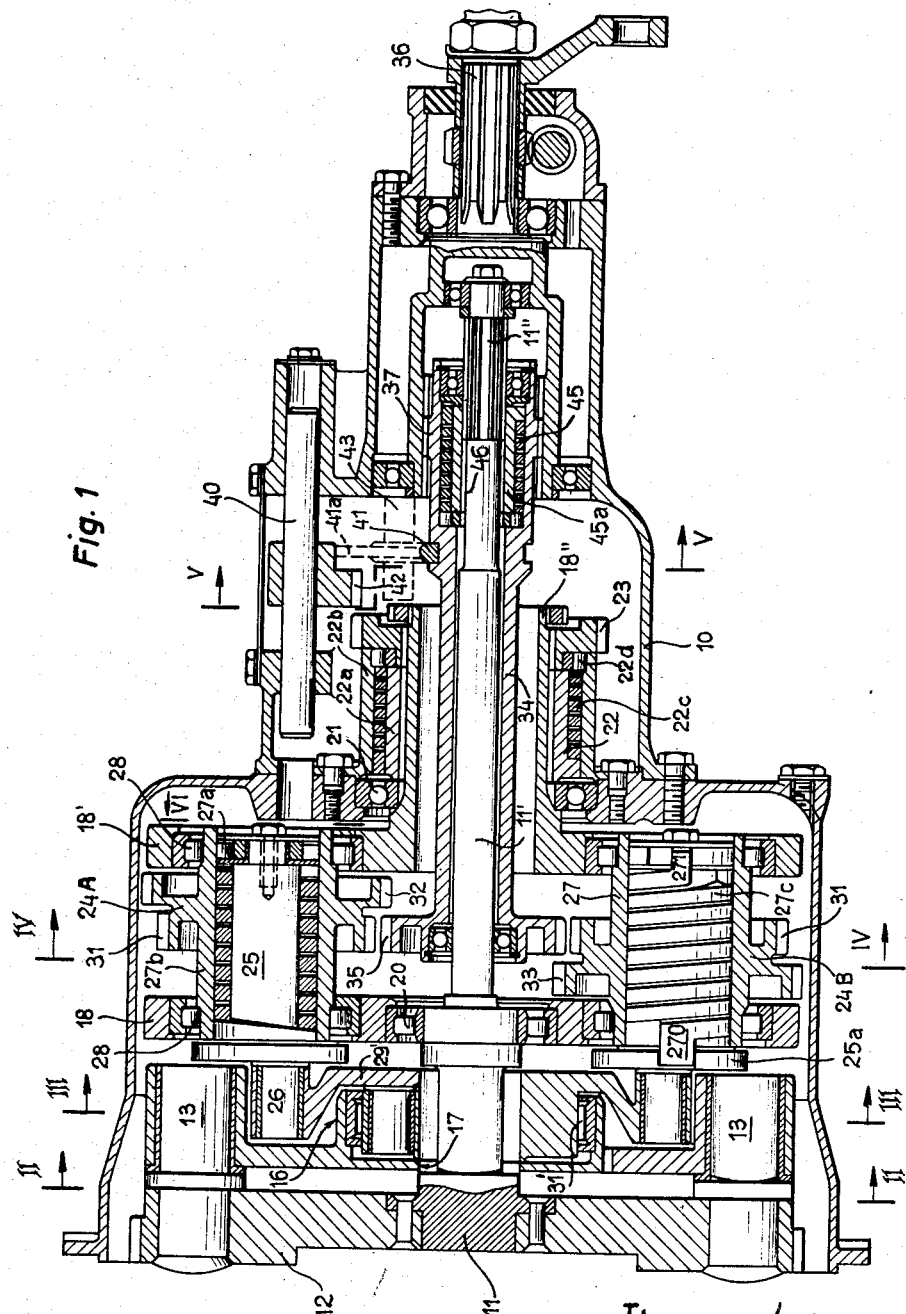
Figure 1 is an axial section of the change speed gear.
Figure 2:
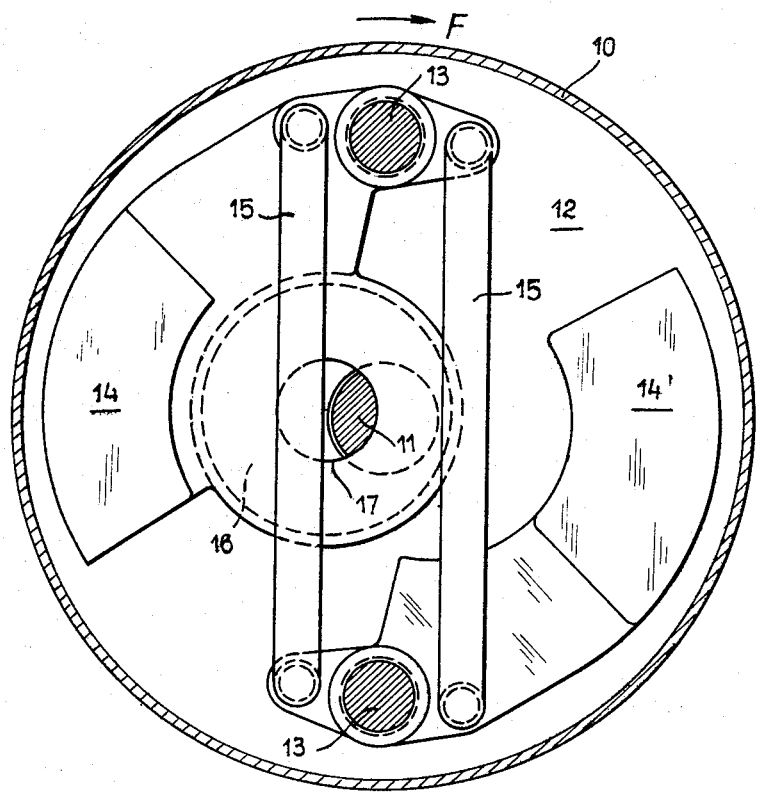
Figures 2, 3, 4 and 5 are cross sections on lines II—II, III—III, IV—IV and V—V, respectively, of Figure 1.

On the drawing, 10 denotes a fixed housing for the transmission. A flywheel 12 is keyed to an input shaft 11 which is connected, in a manner not shown, with a prime mover, such as, for instance, an electric motor, an internal combustion engine or the like. The sense of rotation of the shaft 11 and flywheel 12 is indicated in the figures by the arrow F. The shaft 11 reaches within the housing 10 by a portion 11' and ends by a splined end 11'' for the purpose that shall be explained hereafter.

The flywheel 12 carries two axial diametrically opposed pivots 13, about which oscillate two centrifugal masses 14, 14' connected together by means of two links 15 for maintaining symmetry of displacements. A circular seat 16 is fixedly connected with the mass 14 and is formed with a central bore 17 through which the shaft 11 extends. In the embodiment shown, the shaft 11 is cut away at the bore 17 merely for constructional and not for essential reasons, in order to afford wider oscillations of the masses 14, 14'.

A rotatable support consisting of two axially spaced discs 18, 18' fixedly connected together by means of bolts 19, is supported at one end by a ball bearing 20 arranged on the shaft 11, and at its other end by a ball bearing 21 arranged on the housing 10, the disc 18' being formed with a portion 18'' in the form of a sleeve coaxial with the shaft 11'. The sleeve 18'' has keyed thereto the inner member 22a of a free-wheeling detent, generically denoted by 22, and a toothed wheel 23. The outer member 22b of the detent 22 is secured to the housing 10 and the arrangement of the lock members 22c and 22d is such that the rotatable support 18, 18' is kept against rotation in a direction against the rotation of the input shaft 11.

Figure 3:
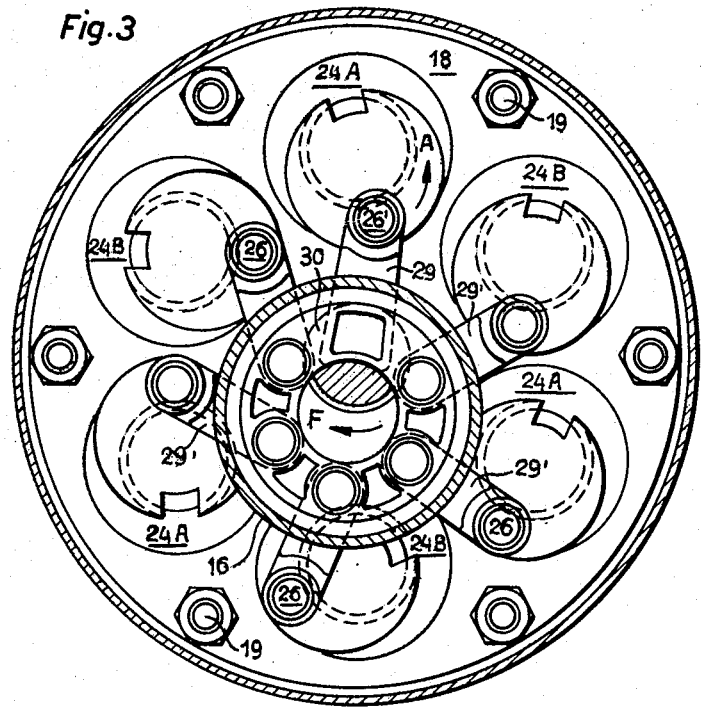

The rotatable support 18, 18' supports a circular row, concentric with the shaft 11, of operative sets 24A and 24B, Figure 3, each comprising oscillatory means and one-way clutching means.

The oscillatory means of each set consists of a shaft 25 (Figure 1) having a crank pin 26 projecting from a disc 25a fixedly connected with the shaft 25. The one-way clutching means, generically denoted by 27, each comprise an outer element 27b, intermediate lock members 27c and 27d, and an inner member consisting of the crankshaft 25. The outer member 27b, of sleeve shape, is supported within the discs 18, 18' by means of ball bearing 28.

One of the crank pins 26, such as the crank pin 26' (Figure 3) has articulated thereto the master connecting rod 29 of a system of connecting rods 29' connecting all the pins 26 to a collar 30 fast with the master connecting rod 29, said collar 30 being rotatable within the circular seat 16, for instance through the interposition of a needle bearing 31'. It will be obvious that an outward expansion of the centrifugal masses 14, 14' increases the eccentricity of the collar 30 and, assuming the seat 16 rotates in the direction of the shaft 11 (Figure 3), this variation in eccentricity results in an increase in the width of oscillation of each crankshaft 25 within the one-way clutching means 27 under the thrust of its associated connecting rod 29, 29' on the crank pin 26, 26' respectively.

Figure 4:
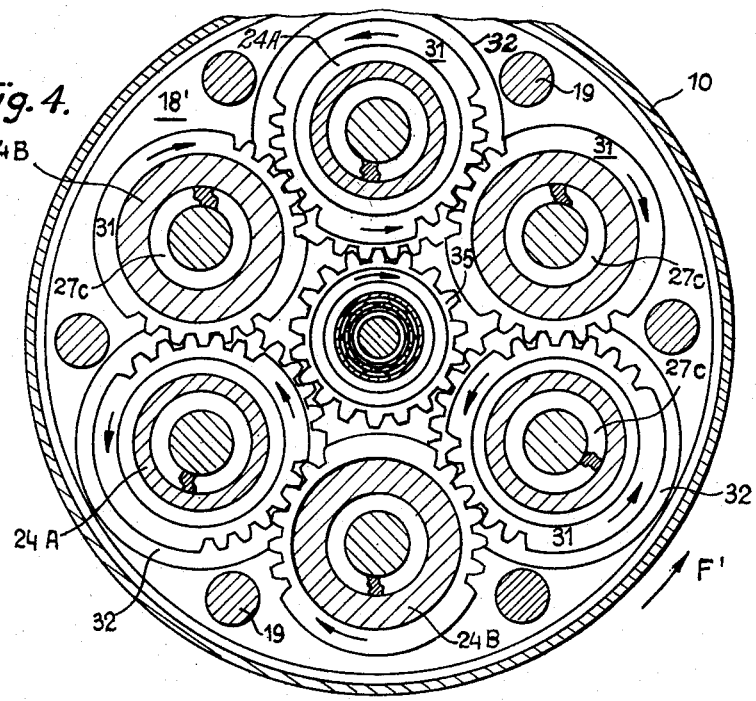

The outer members 27b of each one-way clutch 27 are coupled with each other by means of coplanar toothed wheel 31, each wheel being fixedly connected to its sleeve 27b (Figures 1 and 4). In the embodiment shown, the operative numbers are six in number (even number), so that in motion each wheel 31 rotates in a direction opposite to the other two wheels 31 meshing therewith. In accordance with the rule of the directions of rotation, the operating sets may be subdivided into two classes: forward speed groups 24A rotating in one direction and reverse speed groups 24B rotating in an opposite direction. The individual one-way clutches 27 are arranged to positively produce this distribution of the directions of rotation, shown by arrows in Figure 4. In other words, in order to cause in Figure 4 the wheel 31 placed higher to rotate in the direction of the arrow, it is necessary for its one-way clutch to exert a positive action in the direction of the arrow A (Figure 3) and slip when its crankshaft 25 is oscillated in an opposite direction. This principle applies to each group 24A and is reversed for the groups 24B.

A forward-speed toothed wheel 32 is fast with the wheel 31 of each group 24A and is greater in pitch diameter than the wheel 31, all the wheels 32 being co-planar to one another and equal in pitch diameter.

Similarly, a reverse-speed toothed wheel 33 is fast with the wheel 31 of each group 24B and is identical with the wheel 32 of the group 24A, the planes of the wheels 32 and 33 being, however, situated on opposite sides with respect to the plane of the wheels 31.

An axially slidable hollow shaft 34 is arranged coaxial with the shaft 11' within the sleeve 18". The shaft 34 reaches by one of its ends into the hollow between the discs 18 and 18' and carries a toothed wheel 35 adapted to mesh with the wheels 32 or 33 or with one of them, according to the axial position of the shaft 34. In the position shown in Figure 1, the wheel 35 is situated in the plane of the wheels 31 without being engaged either by the wheels 32 or by the wheels 33. On displacing the shaft 34 to the right, the wheel 35 meshes with the forward-speed toothed wheels 32 which rotate the wheel 35 in the direction of the input shaft 11 (see Figure 4). The rotational speed of the wheel 35 thus depends directly upon the widths of oscillation of the osliclatory means 25, 26, that is, upon the eccentricity of the collar 30 which is responsive to the centrifugal masses 14, 14'.

Similarly, by displacing the shaft 34 to the left (Fig. 1) the wheel 35 meshes with the reverse-speed toothed wheels 33 and the shaft 34 is rotated at variable speed in a direction opposite to the input shaft 11.

It should be pointed out that the wheels 31 on the sleeves 27b are not essential for the operation of the transmission. In fact, in the example described all the one-way clutches 27 constantly operate, whether the wheel 35 is in its forward speed or reverse speed position, respectively, thereby increasing the transmissible power and smoothness of movement at the output of the transmission. It will be obvious that this construction requires an even number of oscillatory means 25, 26, otherwise a distribution of rotations as shown in Figure 4 would not be possible. By eliminating the wheels 31, each operative group would operate independently of the others, more particularly, the groups 24A would operate for forward speed only, and the groups 24B for reverse speed only. It will be obvious that wheel 35, instead of receiving six impulses, as in the example shown, on one turn of the shaft 11, only receives three. In the latter case, however, the number of the operating sets may be even an odd number.

The hollow shaft 34 is practically a part of the output shaft 36 with which it is connected in rotation by means of a splined coupling 37 which permits axial displacement of the shaft 34 with respect to the shaft 36.

On considering Figure 4, it will be seen that, when the wheel 35 meshes with the forward-speed toothed wheels 32, the rotatable support 18, 18' is subjected to a reaction force which tends to rotate it about the shaft 11 in the direction F'. Simple notions of mechanics, available to any expert of the branch, makes it understood that this reaction force is variable, more particularly, it sinks on increase of the eccentricity of the collar 30, goes over the zero value and starts increasing in a negative sense, that is, the rotatable support 18, 18' tends to rotate concurrently with the engine shaft.

The positive reaction is absorbed by the freewheel detent 22 which prevents rotation of the support 18, 18' in a direction opposite to the shaft 11. As the speed of the shaft 11 rises, the eccentricity of the collar 30 increases and the wheel 35 is operated at an increasing speed, first by the operative sets 24A and 24B only, thereupon also by the rotatable support 18, 18' which starts rotating in the direction of the shaft 11.

Figure 5:
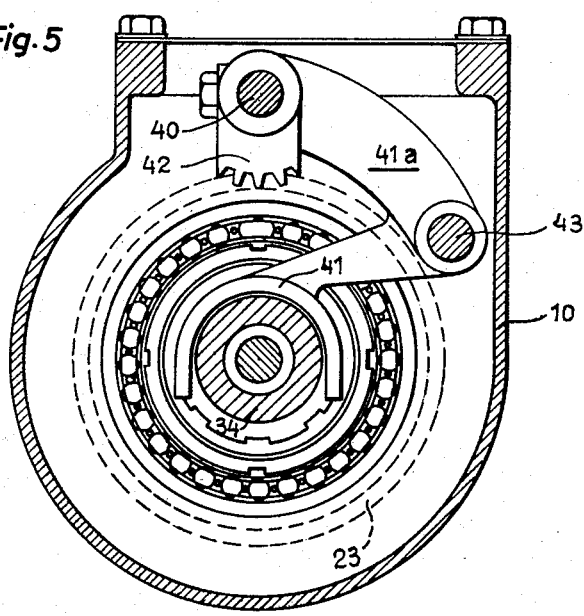

This sequence of operation is annulled when the wheel 35 is coupled with the reverse-speed toothed wheels 33, because in this case the rotatable support 18, 18' starts rotating at once with the shaft 11 annulling the reverse action of the wheels 33. In order to avoid this drawback, the bolt 40 producing axial displacements of the shaft 34 by means of a fork 41 (Figures 1 and 5) has fixed thereto a toothed segment 42. When the shaft 34 is axially displaced to bring the wheel 35 into mesh with the reverse-speed wheels 33, the toothed segment 42 meshes with the wheel 23. Since the segment 42 is kept against rotation by the arm 41a of the fork 41, said arm sliding on a rod 43 fixed to the housing 10, the wheel 23 remains blocked and the support 18, 18' cannot rotate in either direction.

The above affording operation for the forward and reverse speed, the last problem to be solved is to afford a direct connection of the output shaft 36 with the input shaft 11 in case the former tends to exceed the latter in speed. With this object in view, the shaft 34 carries at the splined end 11" of the shaft 11' a one-way clutch 45, of which the inner member 45a is provided with splines 46 engaging the splined end 11" for forward speed only. The one-way clutch therefore permits of the hollow shaft 34 rotating more slowly than the input shaft, but fixedly connects the input shaft with the output shaft 36 when the latter tends to exceed the former in speed.

Figure 6:
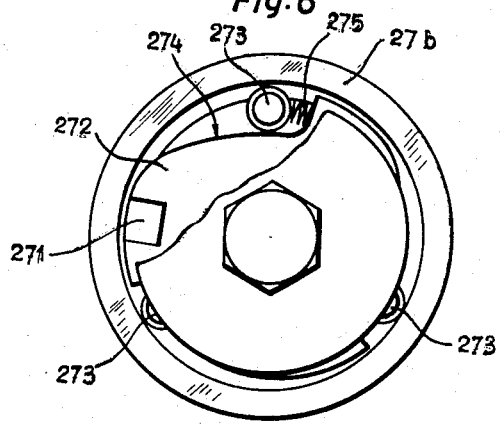
Figure 6 is a sectional view of a one-way clutch on line VI—VI of Figure 1.

The construction described employs one-way clutches and free-wheeling devices of the type described and shown in my Italian patent application filed May 2, 1952. A device of this kind is characterized by the fact that it comprises instantaneously responding intermediate members which control the action of intermediate power members. Referring to Figures 1 and 6, a spring 27c is wound about the inner member of a one-way clutch 27 and is anchored at one end 270 to the inner member and at its other end 271 to a disc 272, of which the rotation with respect to the inner member in a given direction causes the spring 27c to diametrally expand, the spring then engaging from the inside the outer sleeve 27b carrying the latter along a rotation. The power transmissible through this type of coupling is relatively great. The disc 272 is a part of the instantaneously responding intermediate members which had been denoted above by 27d or 22d, respectively, in the case of the detent 22. The intermediate members comprise rollers 273 slidable on inclined cam surfaces 274 of the disc 272 and urged by springs 275 by wedging between said cam surfaces 274 and the sleeve 27b, as in known types of free wheels. In operation the rollers 273 come into action first, so that the disc 272 is caused to rotate through a certain angle with respect to the inner member of the one-way clutch, causing the spring 27c to expand, said spring engaging in turn the outer member 27b, which is thereby fixedly connected in rotation with the inner member.

Unlocking of the rollers 273 instantaneously releases the spring 27c which collapses and releases the outer member 27b.

It will be obvious that a one-way clutch mechanism of any known type, other than described, may be employed within the scope of this invention.

According to requirements the transmission may comprise one operative set only, for instance 24A, where reversal of speed is not needed, or at least two operating groups, namely a forward speed group 24A and a reverse-speed group 24B, when forward and reverse drive, both at variable speed, are desired. The free-wheel detent 22 is not essential and may be eliminated in similar constructions; in this case, the support 18, 18' could be fast with the housing 10 for the transmission.

The variation in eccentricity of the collar 30, which is obtained here through the action of the centrifugal masses 14, 14', can be produced by any other suitable mechanisms of a mechanical, hydraulic, electromagnetic or other type.

What I claim is:

1. In a torque transmission comprising a rotary input shaft, an eccentric member positioned on said shaft, means for varying the eccentricity of said member, a number of cranked shafts arranged around said input shaft and having the cranks oscillated in turn by said eccentric member, forward-speed toothed wheels and forward-speed one-way clutch means connecting said wheels with some of said crankshafts, reverse-speed toothed wheels and reverse-speed one-way clutch means connecting said last named wheels with the remaining crankshafts, an output shaft, and a toothed wheel on said ouput shaft selectively meshing with said forward- and reverse-speed toothed wheels, respectively, a fixed casing, a rotatable support supporting said crankshafts, said toothed wheels and said one-way clutch means, a free-wheeling detent between said rotatable support and the casing keeping said support against reverse rotation, means for selectively coupling the output shaft with the forward- and reverse-speed toothed wheels, respectively, and means associated with said last named means for locking the rotatable support as the transmission is in a reverse speed condition.

2. Torque transmission as claimed in claim 1, wherein a one-way clutch is provided, directly connecting the output shaft with the input shaft when the drive is transmitted from the former to the latter, and a coupling means selectively connecting and disconnecting said one-way clutch with the input shaft for a forward and reverse speed operation.

3. Torque transmission as claimed in claim 1, comprising an even number of oscillatory means and wherein toothed wheels are provided, connecting for rotation each one-way clutch means with the two adjacent one-way clutch means.

ALESSANDRO DE MARCHI.

References Cited in the file of this patent

UNITED STATES PATENTS

| Number | Name | Date |
|---|---|---|
| 2,256,903 | Joyner et al. | Sept. 23, 1941 |
| 2,417,944 | Osborne | Mar. 25, 1947 |

FOREIGN PATENTS

| Number | Country | Date |
|---|---|---|
| 990,178 | France | Sept. 18, 1951 |